United States Patent Office 3,240,143
Patented Mar. 15, 1966

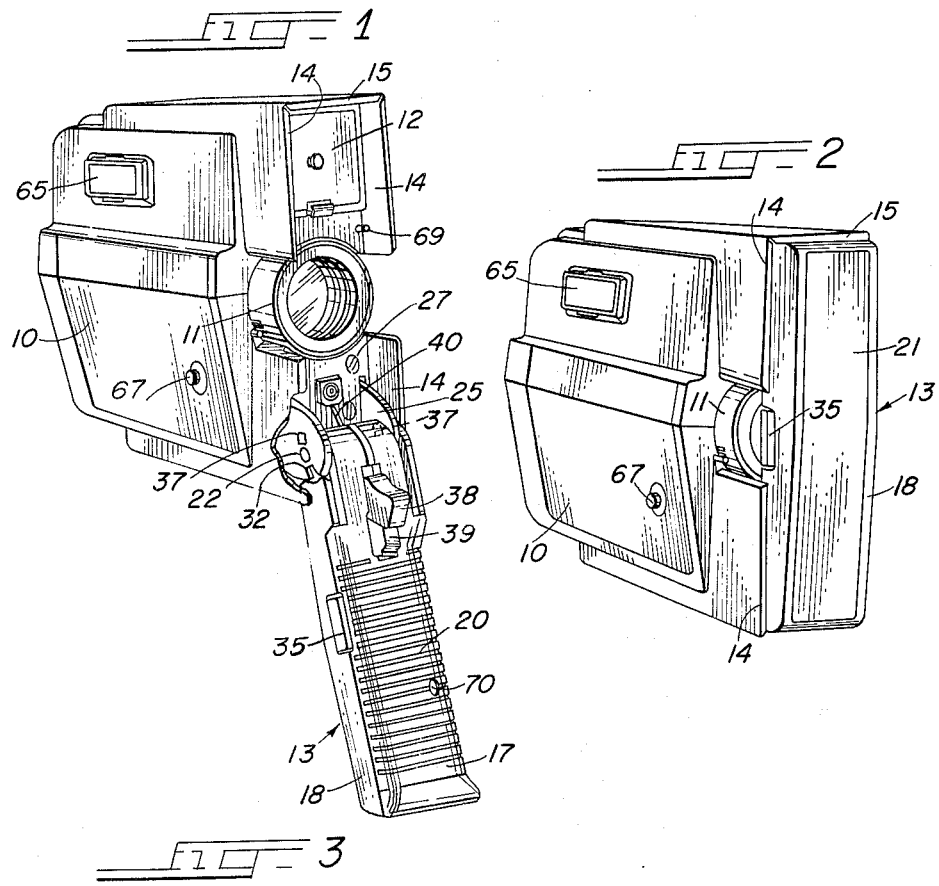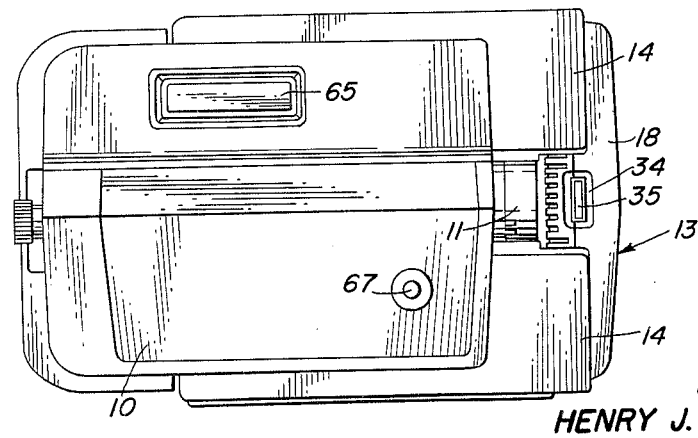

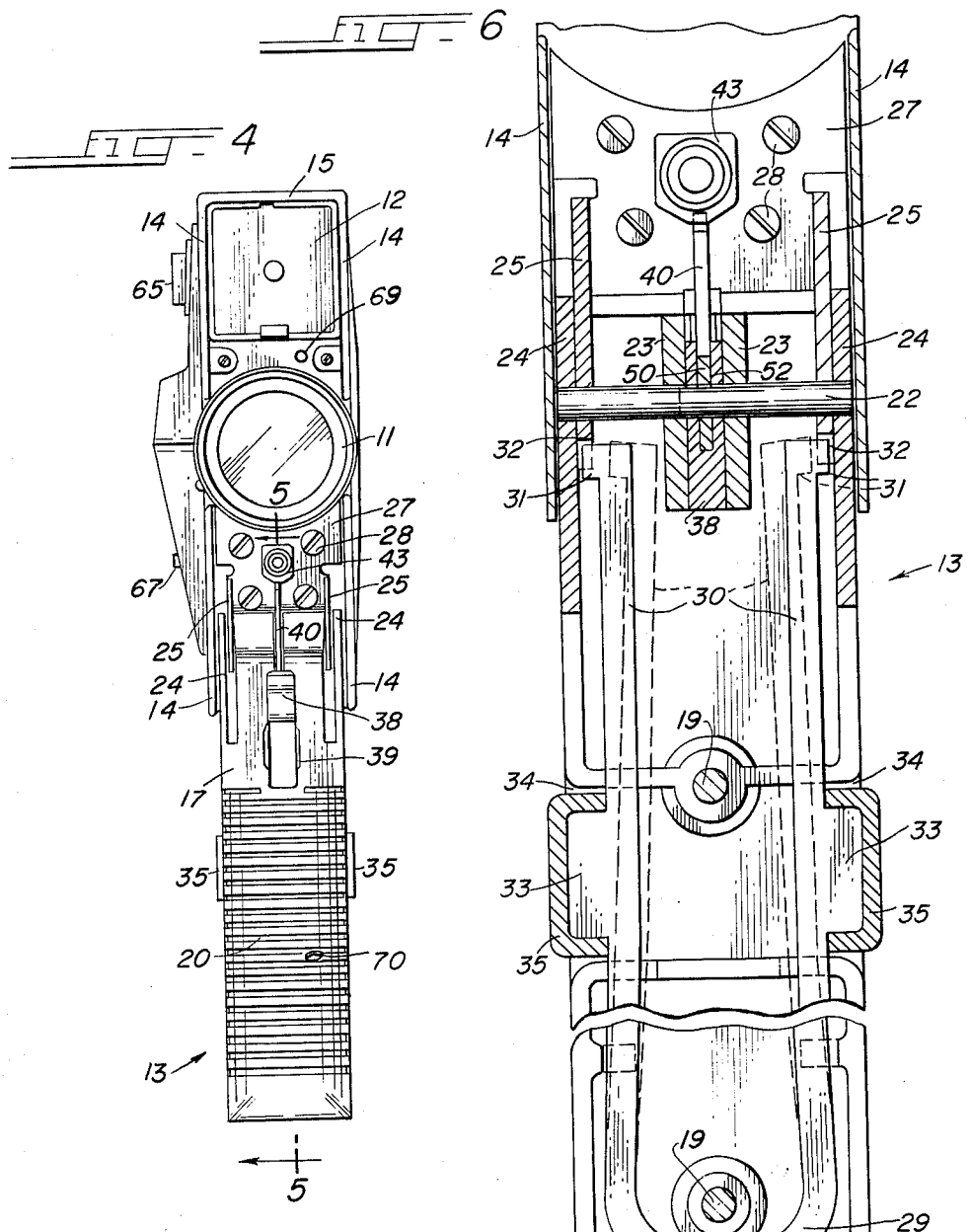

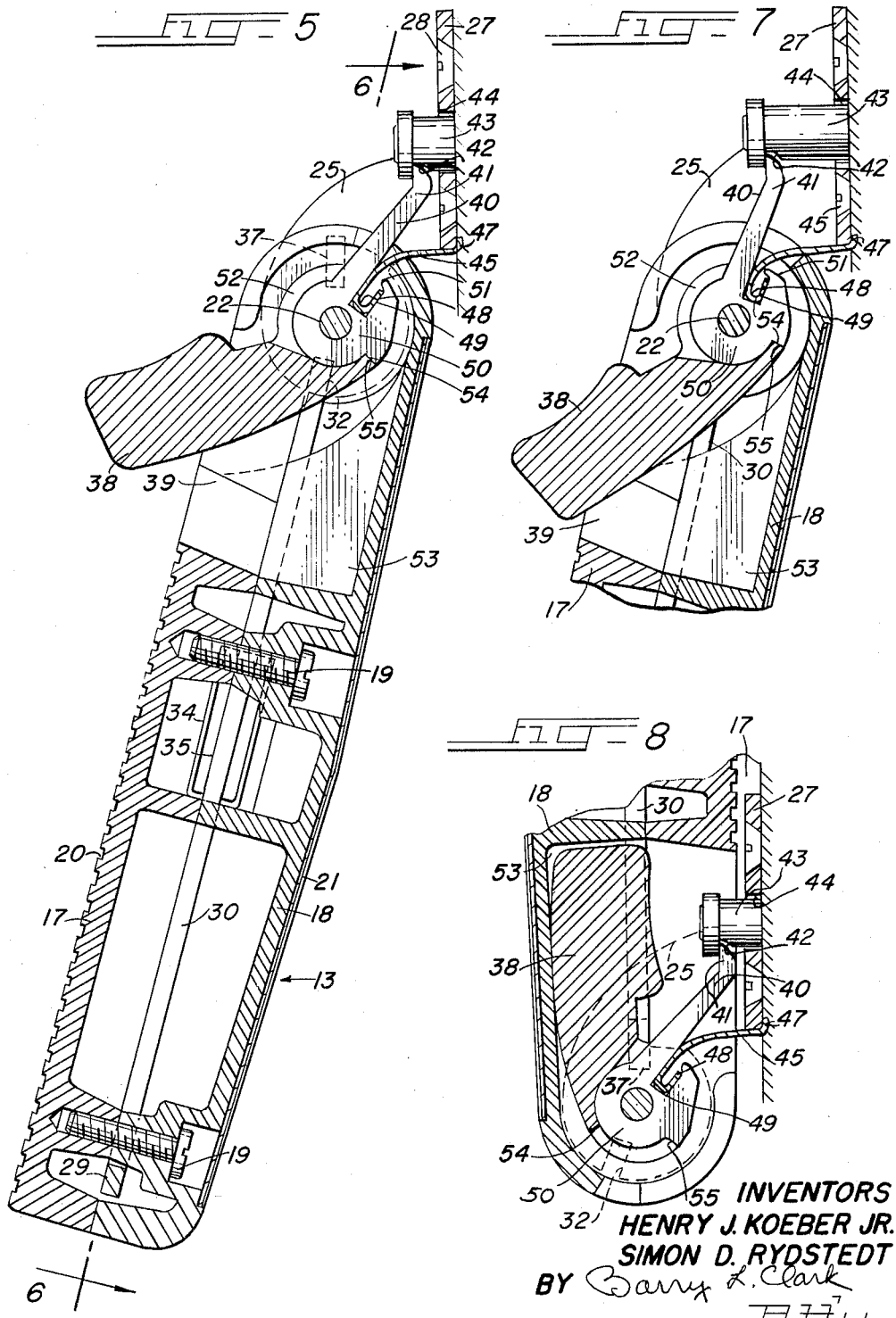

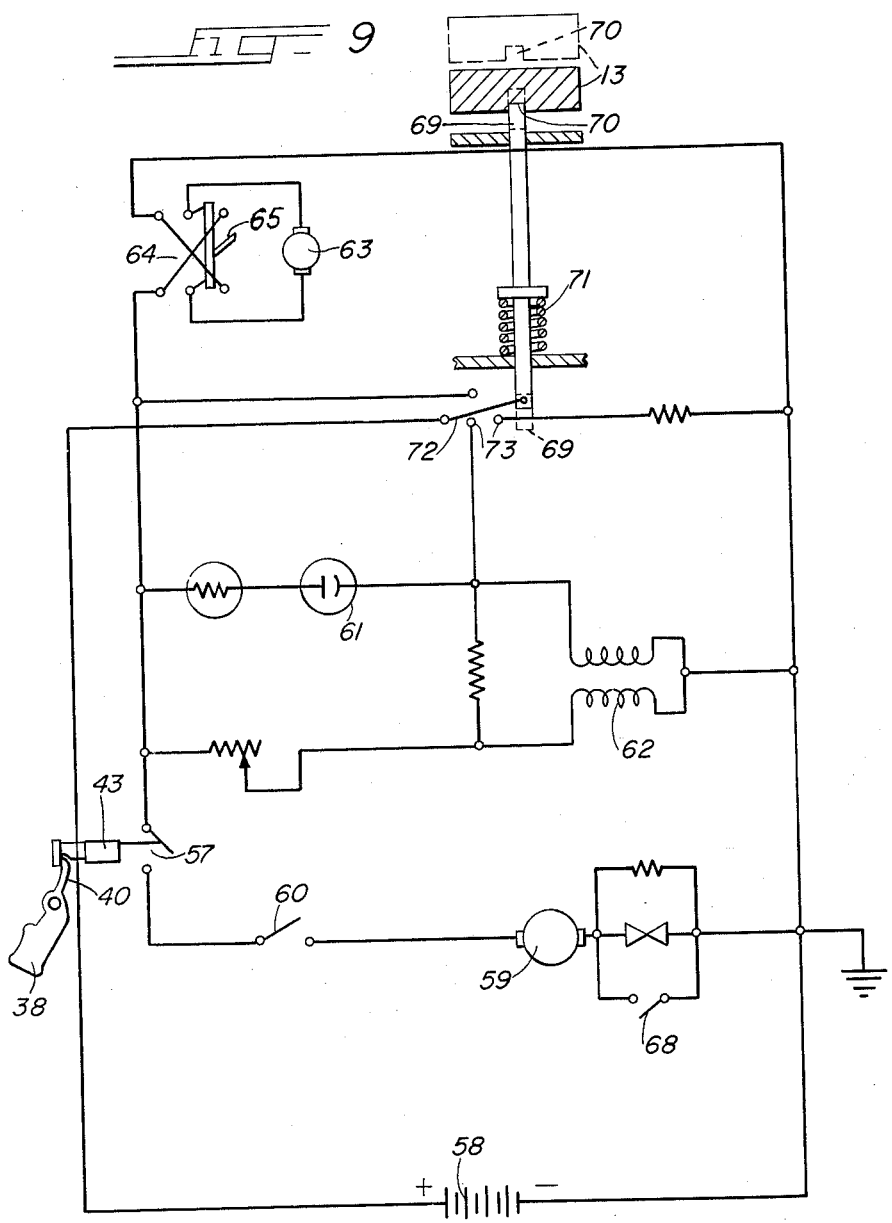

3,240,143
MOTION PICTURE CAMERA
Henry J. Koeber, Jr., Deerfield, and Simon D. Rydstedt, Lincolnwood, Ill., assignors to Bell & Howell Company, Chicago, Ill., a corporation of Illinois
Filed Mar. 13, 1964, Ser. No. 351,717
16 Claims. (Cl. 95—86)

This invention relates to improvements in motion picture cameras and more particularly concerns a new and improved combination folding hand grip and lens protector and control means for such cameras.

Manual supports of the pistol grip type for small hand carried and operated motion picture cameras are in common use. Heretofore, such hand grips or handles have either been of the detachable type or rearwardly or side folding types. In the detachable type, the hand grip is attached to the camera case for use and is detached for storage purposes. Folding handles have generally added bulk to the side or bottom of the camera assembly and when folded have merely contributed to such bulk without serving any useful purpose.

Accordingly, an important object of the preesnt invention is to provide a new and improved motion picture camera construction provided with a novel foldable handle serving multiple functions.

Another object of the invention is to provide a novel camera assembly equipped with a foldable handle which in the folded condition serves as a lens protector.

A further object of the invention is to provide a new and improved camera construction having a foldable supporting handle which provides a part of the camera casing in the folded condition of the handle.

Still another object of the invention is to provide a novel folding hand grip structure for cameras which provides not only convenient supporting mechanism for the camera but also provides positive disabling means to avoid unintentional operation of the camera when the handle is in a folded relation to the associated camera housing.

Other objects, features and advantages of the present invention will be readily apparent from the following detailed description of a preferred embodiment thereof taken in conjunction with the accompanying drawings, in which:

FIGURE 1 is a perspective view of a camera equipped with a folding handle according to the present invention and shown in its extended operative position;

FIGURE 2 is a perspective view of the camera with the handle folded;

FIGURE 3 is a side elevational view of the camera with the handle folded;

FIGURE 4 is a front elevational view of the camera with the handle extended;

FIGURE 5 is an enlarged fragmentary longitudinal sectional detail view taken substantially on the line V—V of FIGURE 4;

FIGURE 6 is a longitudinal sectional elevational detail view taken substantially on the line VI—VI of FIGURE 5;

FIGURE 7 is a fragmentary sectional elevational detail view corresponding to the upper portion of FIGURE 5 but showing the trigger operated to actuate the associated control switch;

FIGURE 8 is a sectional elevational detail view similar to FIGURE 7 but showing the relationship of parts in the folded condition of the handle; and FIGURE 9 is a schematic view of the control circuitry and associated mechanism of the camera.

In FIGURES 1–4 is depicted a motion picture camera comprising a housing 10 within which are contained the usual operating apparatus, film magazine structure and various control mechanism, in this instance adapted to be motivated electrically through a self-contained power source comprising suitable battery means. At the front of the camera is a lens mount 11 which is desirably of the zoom type. Above the lens mount is a battery compartment 12. For supporting the camera manually for photographing, a pistol grip type handle 13 is provided on the forward lower portion of the camera housing.

According to the present invention, the handle 13 is so constructed and arranged in relation to the camera housing 10 as to be foldable from an extended service position projection generally downwardly, and in this instance also angled slightly forwardly, at the lower front end of the housing (FIGURES 1 and 4) and hingedly pivoted about a transverse horizontal axis to be swung into a collapsed, folded position over the front of the housing (FIGURES 2 and 3). In its closed position, the handle 13 appears substantially as part of the housing, being of a length to cover the front of the camera throughout its vertical extent and being received protectively between vertical forward side wall extension flanges 14 on the housing at each side of the front and a top wall extension flange 15 which together with the contiguous side wall flanges 14 provides a recess for the handle 13. In the fully folded position, the handle 13 serves as a closure or cap protectively across the lens assembly 11.

In a rugged, lightweight construction, the handle 13 comprises a pair of opposed, complementary, elongated front and rear handle shells 17 and 18, respectively, secured together as by means of screws 19 to provide a hollow handle assembly having a substantially solid external appearance and of a size to be conveniently grasped by the hand of a person using the camera. A scored or grooved outer, front face 20 on the front handle shell 17 provides a frictional, non-slipping, palm grip. A smooth back for the handle is provided by a plate or panel 21 set flush in the rear face of the rear handle section or shell 18, covering and hiding the heads of the screws 19.

Hinged attachment of the handle 13 to the camera housing 10 is effected through the medium of a pivot or hinge pin 22 (FIGURES 5 and 6) extending through hinge ears or flanges 23 and 24 on the head ends of the front and rear handle shells 17 and 18, respectively, and hingedly connecting the head end of the handle to a pair of spaced parallel forwardly projecting hinge ears 25 rigid on a bracket plate 27 secured as by means of screws 28 to the front of the camera housing below the lens mount 11.

In order to latch the handle 13 in respectively extended, open service position and in the closed, folded position, means are provided comprising a generally U-shape resiliently flexible spring latch member 29 mounted within the chamber in the hollow handle, with its connecting yoke adjacent to the free end of the handle and with elongated, coextensive latch arms 30 extending along the sides of the handle and presenting respective outwardly extending latch dog detents 31 for engagement in respective generally downwardly opening keeper notches 32 in the margin of the supporting hinge plate flanges 25 whereby to retain the handle in its extended, service position. Release of the spring latch detents or dogs 31 from the keeper notches 32 is effected by manually compressing the spring latch legs, as conveniently effected through the medium of pressure lugs 33 integral intermediate ends of the respective legs and extending outwardly through suitable openings 34 in the side wall of the rear handle shell section 18. Suitable finishing and extension caps 35 are desirably mounted on the lugs 33. In the folded position of the handle 13, the latch dogs 31 are latchingly engageable in respective keeper slots 37 provided in the hinge plate flanges 25 above the hinge pin 22 (FIGURE 1). Through this arrangement, release of the latch 29 can be readily effected by applying moderate pressure simultaneously inwardly on the releasing lugs 33, for swinging the handle 13 either from its extended position as in FIGURE 1 or from its folded position as in FIGURES 2 and 3, the latch automatically snapping into latching position with respect to either the keeper notches 32 or the keeper slots 37, as the case may be, to retain the handle in the position to which it is swung. Between the keeper notches and slots, the lugs or dogs 31 slidably engage the inner faces of the respective hinge ear flanges 25. It may be noted that pressure against either of the release projections or lugs 33 alone will not effect release of the latch, but it is necessary to effect equal and opposite pressure on both of the release projections simultaneously to release the latch for displacement and swinging of the handle. This substantially precludes accidental unlatching of the handle.

For trigger operation of the camera, a digitally operable trigger 38 is pivotally mounted on the hinge pin 22 and projects operatively through a suitable slot 39 in the front handle section shell 17 (FIGURES 1, 4 and 5). Operatively associated with the trigger is a trip finger 40 which has a terminal 41 engaging within a notch 42 in the lower side of a switch actuator body 43 reciprocably slidably mounted in the front of the camera housing below the lens mount 11 and projecting through a guide aperture 44 in the bracket plate 27 adjacent to the proximal or hinged end portion of the handle 13. Through this arrangement, inward pressure of the trigger 38 swings it inwardly within the clearance slot 39 to swing the trip finger 40 forwardly and thus move the switch actuator 43 outwardly as shown in FIGURE 7.

For convenience in normally biasing the trigger assembly into the ready, non-operating position as shown in FIGURE 5, a biasing return spring 45 is provided which is conveniently in the form of a leaf spring having a hooked anchoring end portion 47 engaging the lower margin of the bracket plate 27. A turned spring head portion 48 on the opposite end of the spring engages within a spring notch 49 in a base portion 50 of the finger and with the spring terminal engaging behind a retaining hook lug 51. As a result, resilient flexing of the return spring 45 during triggering of the camera as shown in FIGURE 7 loads the spring to return the trigger 38 to the non-operating position upon release of digital pressure thereon.

To accommodate folding of the handle 13, a releasable joint connection of the trigger 38 and the trip finger 40 is provided. Conveniently this comprises providing the base portion 50 of the trip finger as a flat disk-like portion which is pivotally mounted on the hinge pin 22 within a complementary slot 52 bifurcating the hinged end portion of the trigger 38, with the trigger and the finger thus relatively pivotally mounted on the same axis on the hinge shaft or pin. This enables the trip finger 40 to remain in the ready position while the trigger 38 swings with the handle 13 into the collapsed folded position as shown in FIGURE 8, with the trigger received in a recess 53 in the handle. In the extended position of the handle 13 as shown in FIGURE 5, a thrust shoulder 54 on the rear of the head end portion of the trigger abuts a complementary thrust shoulder 55 on the base portion 50 of the trip finger whereby a solid operative connection is afforded between the trigger and the trip finger for actuating the trip finger in response to inward or rearward pressing of the trigger.

By reference to FIGURE 9, it will be observed that the switch operator 43 is adapted when displaced outwardly by the trigger 38 and the trip arm 40 to close a normally open switch 57 in an operating circuit including a power source comprising a battery 58 and a drive motor 59. In addition, the circuit includes a master control switch 60 which may be operated from any suitable location on the camera housing. Where the camera is equipped with through-the-lens light meter iris control for automatic stop opening adjustment responsive to image light, the circuit may include a photocell 61 and a galvanometer 62. Additionally, the circuit includes a reversible power zoom motor 63 adapted to be selectively operated through a switch 64 having an operating button 65 suitably mounted for operation at the outside of the camera housing 10 (FIGURES 1–4). Another switch control button 67 accessible at the outside of the camera housing is arranged to close a normally open switch 68 to effect higher speed operation of the governor controlled drive motor 59 for slow motion photography.

In order to cut off all current from the battery when the handle 13 is in its folded position, a switch operating pin plunger 69 (FIGURES 1, 4 and 9) is mounted in suitable location as between the lens mount 11 and the battery compartment 12 and to project outwardly a sufficient distance for engagement by the handle. Thereby, when the handle 13 is folded into the recess defined by the flanges 14 and 15, it engages the free end of the pin 69, as within a shallow recess 70 in the outer face of the handle section 17, and the pin is depressed inwardly against the action of biasing means such as a compression spring 71 to open a normally closed safety disconnect switch 72. When the handle 13 is swung toward extended position, the switch actuating pin 69 is automatically biased outwardly by the spring 71 into the switch closing position.

Another function of the switch actuating pin 69 is to enable checking of the battery condition. By manually pressing inwardly on the pin 69, the switch 72 is opened and a circuit closed across contacts 73 through part of the automatic exposure control device to give an indication in the viewfinder of the battery condition.

From the foregoing, it will be apparent that the present invention provides a highly advantageous multi-function handle structure affording in its extended position a pistol grip for supporting the camera during filming; and in its folded position serving as a front end closure for the camera housing and providing a protective guard over the camera lens, disabling the operating trigger, and actuating a safety disconnect switch in the power circuit.

It will be understood that modifications and variations may be effected without departing from the scope of the novel concepts of the present invention.

We claim as our invention:

1. In combination in an electrically operated camera construction including a housing having therein operating mechanism and electrical circuitry, a front end on said housing including a lens mount, with an operating switch actuator below the lens mount and a disabling switch operator spaced therefrom and projecting forwardly, flanges projecting forwardly from the top and sides of said front end and defining a recess, a pistol grip handle pivotally mounted on the lower end portion of said front end and swingable between a generally downwardly extending grip position folded into said recess protectively over said lens mount, releasable latch means for retaining the handle in the extended and folded positions, the handle engaging said disabling switch operator in the folded position, a trigger mounted pivotally on the lower portion of said end and having means for selectively actuating said operating switch actuator, and means for disabling the trigger automatically in the folded position of the handle.

2. In combination in an electrically operated camera construction including a housing having therein operating mechanism and electrical circuitry, a front end on said housing including a lens mount, with an operating switch actuator below the lens mount, flanges projecting forwardly from the top and sides of said front end and defining a recess, a pistol grip handle pivotally mounted on the lower end portion of said front end and swingable between a generally downwardly extending grip position and a position folded into said recess protectively over said lens mount, releasable latch means for retaining the handle in the extended and folded positions, a trigger mounted pivotally on the lower portion of said end and having means for selectively actuating said operating switch actuator, and means for disabliing the trigger automatically in the folded position of the handle.

3. In combination in an electrically operated camera construction including a housing having therein operating mechanism and electrical circuitry, a front end on said housing including a lens mount, with an operating switch actuator below the lens mount and a disabling switch operator spaced therefrom and projecting forwardly, a pistol grip handle pivotally mounted on the lower end portion of said front end and swingable between a generally downwardly extending grip position and a position folded over said lens mount, releasable latch means for retaining the handle in the extended and folded positions, the handle engaging said disabling switch operator in the folded position, a trigger mounted pivotally on the lower portion of said end and having means for selectively actuating said operating switch actuator, and means for disabling the trigger automatically in the folded position of the handle.

4. In combination in a camera construction including a housing having therein operating mechanism, a front end on said housing including a lens mount, an operating actuator below the lens mount, a pistol grip handle pivotally mounted on the lower end portion of said front end and swingable between a generally downwardly extending grip position and a position folded onto said front end over said lens mount, releasable latch means for retaining the handle in the extended and folded positions, a trigger mounted pivotally on the lower end portion of the housing and having means for selectively actuating said operating actuator, and means for disabling the trigger automatically in the folded position of the handle.

5. A camera construction as defined in claim 4, in which said trigger includes a trip finger engaging said actuator, and separable shoulders operatively connecting the trigger and finger in the extended position of the handle, said shoulders being separated by displacement of the trigger by the handle in the folded position.

6. In combination in a camera construction including a housing having operating mechanism therein, a front end on said housing including a lens mount, flanges projecting forwardly from the top and sides of said front end and defining a handle-receiving recess, and a pistol grip handle pivotally mounted on the lower end portion of said front end and swingable between a generally downwardly extending grip position and a position folded into said recess protectively over said lens.

7. In combination in a camera construction including a housing having operating mechanism therein, a front end on said housing including a lens mount, flanges projecting forwardly from the sides of said front end portion, a pistol grip handle pivotally mounted on the lower end portion of said front end and swingable between a generally downwardly extending grip position and a position folded between said flanges protectively over said lens, and releasable latch means for retaining the handle in the extended and folded positions.

8. A camera assembly comprising, a housing having a lens mount in the front thereof, and a pistol grip handle hingedly mounted on the front portion of the housing and movable between an extended gripping position and a folded lens protecting position along the front of the housing across said lens mount.

9. A camera assembly comprising, a housing having a lens mount in the front thereof, a pistol grip handle hingedly mounted on the front portion of the housing and movable between an extended gripping position and a folded lens protecting position along the front of the housing across said lens mount, and means on the housing coacting with the handle in folded position to protect the handle against lateral stress.

10. A camera assembly comprising, a housing having a lens mount in the front thereof, said housing having flange means projecting forwardly to form a forwardly and downwardly opening recess, a handle hingedly mounted on the lower portion of the camera front and swingable between a generally downwardly extending pistol grip position and a folded position over the front of the camera protectively over said lens mount and received within said recess.

11. A camera assembly comprising, a housing having a front end portion with a lens mount, a pistol grip handle, a bracket on the lower part of said front end portion, means hingedly connecting an end portion of the handle to said bracket for swinging between a generally downwardly extending hand grip position and a folded position over said front end portion across said lens mount, and releasable latch means carried by the handle and coacting with said bracket to retain the handle in its extended grip position.

12. A camera assembly comprising, a housing having a front end portion with a lens mount, a pistol grip handle, a bracket on the lower part of said front end portion, means hingedly connecting an end portion of the handle to said bracket for swinging between a generally downwardly extending hand grip position and a folded position over said front end portion across said lens mount, and releasable latch means carried by the handle and latchingly engageable with keeper means on said bracket in the extended and folded positions of the handle.

13. A camera assembly comprising, a housing having a front end portion with a lens mount, a pistol grip handle, a bracket on the lower part of said front end portion, means hingedly connecting an end portion of the handle to said bracket for swinging between a generally downwardly extending hand grip position and a folded position over said front end portion across said lens mount, said handle being interiorly hollow, and spring latch means housed within the handle with means engageable externally of the handle for operating the latch means and means latchingly interengageable with a portion of the bracket and releasable by manipulation of said operating means.

14. A camera assembly comprising a housing, a hollow pistol grip handle, a bracket on the housing having a pair of rigid hinge ears, a hinge pin connecting one end portion of the handle to said ears, a generally U-shaped spring latch member mounted within the handle and having a pair of resiliently flexible legs having free end portions adjacent to said ears and a connecting yoke adjacent to the distal end portion of the handle, said legs being disposed adjacent to the longitudinal sides of the handle and having outwardly projecting manipulating lugs manually accessible externally of the handle for pressing the spring legs toward one another, the free end portions of the spring legs having latching dogs, and keeper means on said ears engageable by said latching dogs in the normal relative positions of the spring latch legs and releasable from the keeper means upon pressing the legs toward one another by simultaneous pressure on said lugs.

15. A moving picture camera having a housing, battery power means normally connected to an automatic exposure control means in said housing, a handle pivotally mounted on the housing and movable between an extended position and a folded position adjacent the housing, and means operable by the handle in its folded position to disconnect said battery power means from said exposure control means.

16. A moving picture camera having a housing and drive operating means in said housing, a handle mounted pivotally on the housing and movable between an extended position and a folded position adjacent the housing, means operable by the handle in its folded position to disable said operating means comprising; a control switch actuating pin normally projecting outwardly from the housing into a first position permitting operation of the camera drive when the handle is in its extended position, said actuating pin being partially depressed to a second position for disabling said operating means when engaged by the handle in its folded position, said operating means further including a battery powered circuit and automatic exposure control means, said actuating pin being further depressable manually to a third position when said handle is in its extended position for closing a circuit including at least a part of said battery powered circuit and said automatic exposure control means for testing the condition of the battery.

References Cited by the Examiner
FOREIGN PATENTS 1,154,804 11/1957 France.
359,603 2/1962 Switzerland.

JOHN M. HORAN, *Primary Examiner.*